UNITED STATES PATENT OFFICE.

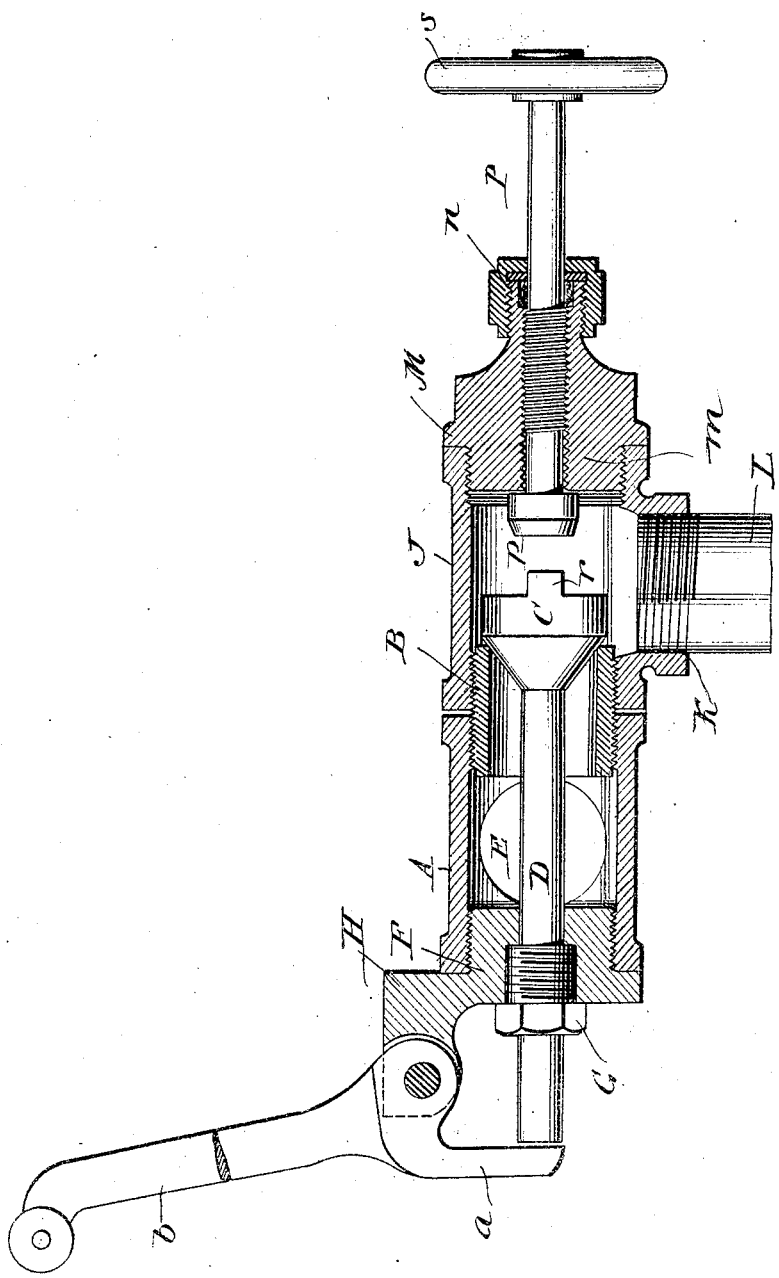

WALLACE W. HOFFMAN, OF JANESVILLE, WISCONSIN.

BLOW-OFF COCK.

1,031,554.

Specification of Letters Patent.

Patented July 2, 1912.

Application filed January 2, 1912. Serial No. 668,881.

*To all whom it may concern:*

Be it known that I, WALLACE W. HOFFMAN, citizen of the United States, residing at Janesville, in the county of Rock and State of Wisconsin, have invented new and useful Improvements in Blow-Off Cocks, of which the following is a specification.

My present invention pertains to blow-off cocks for boilers; and it has for one of its objects to provide a simple, inexpensive and reliable blow-off cock which embodies no parts that are likely to get out of order after a short period of use, and is easy to operate.

Another object of the invention is the provision of means for positively closing the valve in the event of the same becoming fixed in any manner in an open position.

Other objects and advantageous features of the invention will be fully understood from the following description and claims when the same are read in connection with the drawings, accompanying and forming part of this specification, in which the figure is a view, partly in section and partly in elevation, illustrating the best practical embodiment of my invention that I have as yet devised.

My novel blow-off cock comprises a casing section A that is interiorly threaded at its opposite ends, and receives in one of said threaded ends an exteriorly threaded nipple B, of brass. This latter extends a material distance beyond the adjacent end of the casing section A, and is designed to form a seat for a valve body C, integral with or fixed to a stem D. It will also be observed that the casing section A is provided in its side with an outlet E.

In the opposite end of the casing section A, with reference to the brass nipple B, is threaded a head F, and in the said head F, which is apertured for the passage of the stem D, is threaded in turn a packing nut G that is preferably of brass. The head F is provided with a bifurcated arm H, and in the said arm is fulcrumed a lever I, one arm *a* of which is opposed to the outer end of the valve stem D. The other arm *b* of the lever I is provided for the connection of a cable (not shown), and it will be readily understood that when the said cable is pulled the valve body C, which is normally held against the brass nipple B by the pressure in a boiler, will be opened against the said pressure. At this point I would have it understood that without involving departure from the scope of my invention, the nipple B or rather the portion thereof that extends beyond the casing section A, may be screwed directly into a boiler wall, in which event the valve body C would be positioned within the boiler. I prefer, however, to position both the extended portion of the nipple B and the valve body C in a casing section J, which casing section J is provided with a threaded aperture K designed to receive a short section of pipe L through which connection is effected between the said casing J and a boiler.

Threaded in the opposite end of the casing section J, with reference to the brass nipple B, is a head M provided with a longitudinal-central threaded aperture *m* and a stuffing box *n*, and threaded in the said head and extending through said stuffing box is a rod P. The said rod P is provided at its inner end with a body *p*, opposed to a protuberance *r* on the valve body C, and at its outer end the rod P is provided with a handle *s*.

So long as the valve C operates, the rod P is allowed to remain in the idle position shown. When, however, the valve or valve body C sticks because of any condition in an open position, the rod P is turned inward through the head M, whereupon the head *p* on the rod by acting against the protuberance *r* of the valve body C, will effectually release and close the said valve body against the seat afforded by the nipple B.

It will be gathered from the foregoing that my novel blow-off cock is simple, inexpensive and durable; also, that the valve body C which is preferably of steel is designed to be tightly held by the pressure in the boiler against the seat afforded by the brass nipple B, and in such manner that leakage past the closed valve will be precluded.

Obviously the casing sections, the heads, and the lever I embodied in the cock, may be of cast-metal with a view of contributing to the cheapness of the cock.

It will further be appreciated from the foregoing that because of the relative arrangement of the valve body C and the brass nipple B to the boiler connection, there is no liability of the valve being fixed in position by freezing, and hence at all times the valve body may be easily moved away from the brass nipple to establish communication between the interior of the boiler and the outlet E.

Having described my invention, what I claim and desire to secure by Letters-Patent, is:

1. A blow-off cock comprising a casing section, a nipple of comparatively soft metal, as brass, fixed to and extending beyond one end of the casing section and having its extended portion exteriorly threaded, means closing the opposite end of the casing section, with reference to the brass nipple, a valve body, of comparatively hard metal, opposed to the end of the nipple remote from the casing section, and a stem fixed with respect to the valve body and extending through the said means at the opposite end of the casing section.

2. A blow-off cock comprising a casing section, a nipple of comparatively soft metal, as brass, fixed to and extending beyond one end of the casing section and having its extended portion exteriorly threaded, means closing the opposite end of the casing section, with reference to the brass nipple, a valve body of comparatively hard metal, as iron or steel, opposed to the end of the nipple remote from the casing section, a stem fixed with respect to the valve body and extending through the said means at the opposite end of the casing section; the said casing section being provided with an outlet, a second casing section threaded on the extended portion of the nipple and inclosing the valve body and equipped with means for connection to a boiler, means closing the outer end of the second-named casing section, and means movable endwise through said closure means and having a head disposed in the second-named casing section and opposed to the valve body.

3. The herein described blow-off cock comprising an exteriorly threaded nipple of comparatively soft metal, as brass, casing sections threaded on said nipple and connected through the medium of the same; one of said casing sections having an outlet and the other being equipped with means for connection to a boiler, means for closing the outer end of the casing section that is provided with an outlet, means for closing the outer end of the other casing section, a valve body, of comparatively hard metal, as steel or iron, opposed to the nipple and contained in the casing section that is equipped with the boiler connection, a stem fixed with respect to the valve body and extending through the closure means at the outer end of the casing section that is provided with the outlet, and a lever fulcrumed on said closure means and having an arm opposed to the outer end of the valve stem.

In testimony whereof I have hereunto set my hand in presence of two subscribing witnesses.

WALLACE W. HOFFMAN.

Witnesses:
W. L. STODDARD,
CHARLES L. MANNING.